United States Patent [19]

Sieber

[11] 4,066,581

[45] Jan. 3, 1978

[54] PROCESS FOR PRODUCING A BOND BETWEEN POLYVINYLENE GLYCOL AND A SUBSTANCE CONTAINING PRIMARY AMINO GROUPS

[75] Inventor: Axel Sieber, Marburg an der Lahn, Germany

[73] Assignee: Behringwerke Aktiengesellschaft, Marburg an der Lahn, Germany

[21] Appl. No.: 771,766

[22] Filed: Feb. 24, 1977

[30] Foreign Application Priority Data

Feb. 26, 1976 Germany .............................. 2607766

[51] Int. Cl.² ...................... C08F 18/24; A61K 31/74; C07G 7/02; B01F 7/16
[52] U.S. Cl. ......................................... 260/8; 195/63; 195/68; 195/DIG. 11; 260/77.5 UA; 424/79; 424/82; 424/178; 526/9
[58] Field of Search ............... 260/8, 77.5 UA; 526/9; 424/79, 82, 178; 195/68, 63

[56] References Cited

U.S. PATENT DOCUMENTS

| | | | |
|---|---|---|---|
| 2,722,525 | 11/1955 | Price et al. ................... | 260/77.5 UA |
| 2,794,013 | 5/1957 | Drechsel ...................... | 260/77.5 UA |
| 2,847,398 | 8/1958 | Gluesenkamp et al. .... | 260/77.5 UA |
| 2,847,402 | 8/1958 | Gluesenkamp et al. .... | 260/77.5 UA |
| 2,993,030 | 7/1961 | Ham et al. ................... | 260/77.5 UA |
| 3,020,290 | 2/1962 | Moss ............................ | 260/77.5 UA |
| 3,037,965 | 6/1962 | Hass ............................. | 260/77.5 UA |
| 3,069,391 | 12/1962 | Schaefgen ................... | 260/77.5 UA |
| 3,331,800 | 7/1967 | Schübel et al. .............. | 260/77.5 UA |
| 3,415,804 | 12/1968 | Polson ......................... | 195/68 |
| 3,455,884 | 7/1969 | Ratz et al. .................... | 260/77.5 UA |
| 3,553,310 | 1/1971 | Csizmas et al. ............. | 195/68 |
| 3,616,229 | 10/1971 | Wildi et al. .................. | 195/68 |
| 3,753,861 | 8/1973 | Forgione ..................... | 195/68 |
| 3,847,743 | 11/1974 | Forgione ..................... | 195/68 |
| 3,944,525 | 3/1976 | Darmory et al. ............ | 260/72.5 |
| 4,001,264 | 1/1977 | Savidge et al. .............. | 195/68 |
| 4,002,531 | 1/1977 | Royer .......................... | 195/68 |
| 4,011,377 | 3/1977 | Dean et al. .................. | 526/9 |
| 4,013,514 | 3/1977 | Wildi et al. .................. | 195/63 |
| 4,025,391 | 5/1977 | Kawashima et al. ........ | 195/63 |

FOREIGN PATENT DOCUMENTS

| | | | |
|---|---|---|---|
| 667,451 | 7/1963 | Canada ........................ | 260/77.5 UA |
| 667,985 | 8/1963 | Canada ........................ | 260/77.5 UA |
| 782,507 | 5/1954 | United Kingdom ........ | 260/77.5 UA |

*Primary Examiner*—Herbert J. Lilling
*Attorney, Agent, or Firm*—Curtis, Morris & Safford

[57] ABSTRACT

A bond is produced between a synthetic polymer containing vicinal hydroxyl groups and a substance containing primary amino groups by treating the polymer with a medium to strong oxidant until a sufficient number of aldehyde groups is formed and then reacting the oxidation product with the substance containing primary amino groups.

7 Claims, No Drawings

PROCESS FOR PRODUCING A BOND BETWEEN POLYVINYLENE GLYCOL AND A SUBSTANCE CONTAINING PRIMARY AMINO GROUPS

This invention relates to a process for producing a bond between a synthetic polymer containing vicinal hydroxyl groups (in the following simply named polymer), especially of polyvinylene glycol and a substance containing primary amino groups, preferably a biologically active substance; the invention also relates to the carrier-bound substance obtained and to the use there-of as specific adsorbent and/or as selective reaction catalyst.

It is known to form a bond between proteins, such as enzymes, antigens, antibodies and compounds capable of undergoing an interaction with biologically active substances, and insoluble polymeric substances, but in many cases the polymeric substances used interact with the biologically active substances. Such an interaction is, however, not desired. Therefore, many attempts have been made to find sufficiently inert polymers which are suitable as carriers for biologically active substances.

German Offenlegungsschrift No. 2,421,789 provides a polyhydroxymethylene also known by the designation of polyvinylene glycol as carrier for biologically active substances. The bond between the biologically active substances and the polyvinylene glycol is produced by reacting the hydroxyl groups of the polyvinylene glycol with specific groupings of the substances to be bound thereto, whereby a covalent bond between the two substances is formed. Comparable processes provide biologically active compounds of a copolymer of vinylene glycol with a biologically active substance (cf. German Application No. P 25 52 510.4 not yet belonging to the state of the art).

It is an object of the present invention to provide a simple process for producing a bond between a substance containing primary amino groups and a synthetic polymer containing vicinal hydroxyl groups, preferably polyvinylene glycol.

This problem is solved according to the invention by reacting the said polymer with a medium to strong oxidant to form aldehyde groups and subsequently reacting the reaction product with a compound containing primary amino groups.

Suitable oxidants in the process of the invention are those the potential of which is approximately in the range of from +1.0 to +1.5 volts, for example compounds of hexavalent chromium such as $CrO_4^{2-}$ or $Cr_2O_7^{2-}$, $MnO_2$, or $Cl_2$. Still stronger oxidants can also be used having a potential above +1.5 volts, for example $MnO_4^+$, $O_3$ or $F_2$.

The degree of oxidation of the polymer by the aforesaid oxidants depends, of course, on the concentration and the time of action, which should be considered when selecting the reaction conditions. The oxidants are generally used in a concentration of from 0.01 to 1.0 M. Strong oxidants having a potential above +1.5 volts are preferably used in a concentration of from 0.01 to 0.1 M, while oxidants having a potential of about +1.0 to about +1.5 volts are preferably used in a concentration of from 0.05 to 1.0 M.

The time of action of the oxidant on the polymer depends on its efficiency; in the case of a relatively weak oxidant, for example the system of dimethyl sulfoxide/glacial acetic acid, it is in the range of from 3 to 18 hours, for the system of dichromate/sulfuric acid it is of from 5 to 60 minutes and for the system periodate/water 1 to 15 minutes. The time of action of other oxidants depends on their efficiency.

In a preliminary test the conditions can be determined under which the desired degree of oxidation is obtained without the polymer being oxidatively decomposed to a noticeable extent and under which a sufficient number of reactive aldehyde groups is formed.

Due to the fact that the polymers to be used, for example polyvinylene glycol, are chemically very stable compounds, the dispersion agent in which the reaction with the oxidant is to be performed in not very critical. Especially good results have been obtained by reacting, for example, polyvinylene glycol with periodate in water, with dichromate in about 0.1 N sulfuric acid and with dimethyl sufloxide in glacial acetic acid.

The action of oxidants on synthetic polymers containing vicinal hydroxyl groups, such as polyvinylene glycol, leads to the formation of aldehyde groups. With usual detection reactions the aldehyde or carbonyl group can be proven by the formation of, for example, phenyl-hydrazones, semicarbazones or oximes. It is, therefore, advisable to check the aldehyde formation after the oxidation of the polymer, for example with the aid of phenyl-hydrazone in acetic acid or a carbonyl indicator producing a color change to establish that a sufficient number of aldehyde groups has been formed for further reaction. Moreover, the consistency of the oxidation product should be observed in order to find out whether the product has been decomposed to an undesired extend by oxidation. This can be done, for example, by comparative determination of the dry weight of the polymer before and after the reaction with the oxidant. The difference in weight should preferably not exceed about 10% by weight.

The reaction product of the oxidation can be directly reacted with a compound containing primary amino groups. As is known, most of the biologically active compounds are proteins containing primary amino groups. The oxidized polymer can be directly reacted with compounds of this type. The oxidation product of the polymer can be reacted not only with a biologically active compound, for example an enzyme, an activator, an inhibitor, an antigen or antibody, a plasma protein, a polypeptide, a peptide or an amino acid, but also with a compound containing amino groups and capable of reacting with biologically active substances. In many cases compounds of this type do not have a direct biological activity themselves, but can be considered inhibitors or antagonists thereof, substrates for enzymes or antobodies for antigens or haptens. Besides protein and peptides, all compounds containing organic α-amino groups can generally be directly reacted with the oxidized polymers.

It is not necessary, of course, that the biologically effective substance is an enzyme, an activator, an inhibitor, an antigen, an antibody, a plasma protein, a blood group specific substance, a peptide hormone, a peptide, or an amino acid. Alternatively, it could be a natural or synthetic substance known to under go an interaction with one of the aforesaid substances and termed effector by the experts. Known effectors are, for example, amino-benzamidine, chlorobenzylamine and 4-aminophenyl-mercury (II) acetate.

When the biologically effective compound to be reacted with the oxidation product of the polymer does not carry primary amino groups itself, the bond can be produced via an intermediate stage. In this case a bifunctional compound containing a primary amino group is reacted with the oxidation product, whereupon the second functional group is reacted with a group of the biologically active compound. Compounds of this type are, for example, the so-called spacers which enlarge the distance of the biologically active grouping from the carrier molecule. Suitable spacers are, for example, hexamethylene diamine, vinyl sulfone derivatives containing diszotizable arylamino groups or sulfuric acid esters of β-hydroxy-ethylsulfones. By reacting the oxidized polymer with glutathione and then reacting the product obtained with 2,2'-dipyridiyl disulfide and a compound containing free sulfhydryl groups, for example, a bond via a disulfide bridge can be produced. In this case, glutathione is the spacer.

Of course, intermediate bonds of this type allow to react the oxidation product of the polymer containing hydroxyl groups not only with biologically active substances, but also with other polymers. Preferably, the oxidation products of the polymers are bonded with one another. In this manner the physicalchemical properties of the carrier can be modified. To this end, bifunctional compounds can be used which are capable to react with the hydroxyl groups of the one polymer as well as with a grouping of the other polymer. In the same manner polyhydroxyl compounds can be first linked to one another, whereupon the resulting product is oxidized. A reaction of this type is of interest with water-soluble polyhydroxyl compounds which can be transformed by such a method into a water-insoluble form. Compounds suitable for this purpose are diisocyanates, for example hexamethylene diisocyanate, bisepoxides, for example hexamethylene bisepoxide, or precursors of bisepoxides such a dibromo-propanol and epichlorohydrin.

In the reaction of the aldehyde groups of the oxidized polymer with the primary amino groups of the participants in the reaction Schiff's bases are formed which are preferably stabilized by reduction. Suitable reducing agents to be used in knwon manner are complex boron hydrides, such as sodiumboron hydride and cyanoboron hydride, complex metal hydrides, such as lithium-aluminium hydride, or Raney nickel as an example of a catalyst for the hydrogenation with hydrogen.

The present invention further relates to the compounds produced by the aforesaid process by binding compounds containing primary amino groups, preferably biologically active substances, to synthetic polymers containing vicinal hydroxyl groups, and to the use of the said compounds as specific adsorbents or as selective reaction catalyst. They are especially suitable for use in affinity chromatography. In this process in special affinity reactions substances are bound to effectors which have been rendered insoluble in water by the process of the invention, whereupon the said substances are eluted in a high purity. As compared to dissolved enzymes, carrier bound enzymes have the advantage that they do not contaminate the reaction products obtained in analytical and preparative processes.

The following examples illustrate the invention.

1. Oxidative activation of polyvinylene glycol (PVG)

1 g of PVG was suspended in 50 ml of a 0.05 molar sodium meta-periodate solution and the suspension was stirred for 15 minutes at room temperature. Next, the suspension was filtered off with suction and the filter residue washed several times with distilled water.

2. Direct bond between IgG (immuno globuling) and the oxidatively activated carrier according to 1)

The activated carrier was suspended in 59 ml of 0.67 molar phosphate buffer having a pH of 7.5 in which about 40 mg of IgG had been dissolved and the suspension was stirred for 3 hours at room temperature. The mixture was then kept overnight at a temperature of 4° C.

When the reaction had taken place, the suspension was centrifuged and the residue washed with 30 ml of NaCl. In this manner, about 18 mg of IgG could be chemically bound to the carrier.

3. Binding of IgG (immuno globuling) via a spacer

.2 g of hexamethylene diamine were dissolved in 50 ml of distilled water and the pH of the solution was adjusted to 8.7 with 2N HCl. 1 g of activated PVG according to 1) was suspended in the solution and allowed to react for 24 hours at room temperature while stirring.

The reaction product was filtered off with suction and washed with distilled water until it was free from excess amine.

To stabilize the Schiff's base sensitive to hydrolysis, the reaction product was reduced with sodium boron hydride. To this end, the product was suspended in 50 ml of methanol and about 10 ml of a 10% solution of sodium boron hydride in methanol was added dropwise. The mixture was refluxed for 15 minutes, filtered off with suction and the filter residue was washed with water.

The reaction product was then suspended in 100 ml of 0.5 molar sodium bicarbonate solution of pH 10 and 2 g of sulfuric acid ester of 1-amino-benzene-4-β-hydroxyethylsulfone (parabase ester). The mixture was allowed to react for 1 hour at 50° to 60° C while stirring. The carrier material for biologically active substances was then filtered off with suction and thoroughly washed with acetone and water. For diazotization the carrier material was suspended in 40 mil of 0.1 N HCl, cooled to 0 to +5° C and about 1 ml of a 0.1 N NaNO₂ solution was added dropwise. After stirring for 30 minutes, the carrier was filtered off with suction and washed neutral.

In this stage of the process a test can be made with β-naphthol to ascertain whether the carrier material is suitable for the production of a bond with a biologically active substance. For this purpose, a portion of about 0.1 g of the diazotized carrier material is suspended in 2 ml of 0.1 N NaOH solution and 0.1 g of β-naphthol is added, whereupon the carrier immediately acquires an orange color. An intense color indicates a sufficient activation and qualification for the reaction with a substance capable of coupling.

The main quantity of the diazonium salt was suspended in 59 ml of 0.67 molar phosphate buffer of pH 7.5 in which 200 mg of IgG had been dissolved and the suspension was stirred for 24 hours at room temperature. After copulation, the reaction product was filtered off with suction and washed with 1 molar NaCl solution until it was free from excess protein.

A quantitative analysis indicated from the attachment of about 160 mg of IgG.

When, instead of IgG, albumin was added to the diazonium salt solution, about 120 mg thereof were bound per gram of PVG carrier.

4. Transverse cross linking of PVG with epichlorohydrin 3 g of PVG were dissolved in 250 ml of 2N solium hydroxide solution at 70° to 80° C, 0.6 g of epichlorohydrin was added and the mixture was stirred for 4 hours at 70 to 80° C and overnight at room temperature. Next, the mixture was poured into 2 l of water while rapidly stirring and neutralized with 2 N CHl. The product was filtered off with suction and washed with water.

The further reactions can be performed in the same manner as described above for PVG.

5. Oxidative activation of PVG with potassium dichromate/sulfuric acid 2 g of PVG were suspended in 100 ml of distilled water and a solution of 0.74 g of potassium dichromate (0.05 molar) and 7.5 ml of 2N $H_2SO_4$ in 50 ml of distilled water were added dropwise while stirring. The suspension was stirred for 15 minutes at room temperature, the reaction product was separated by centrifugation and washed with distilled water.

The further reaction with hexamethylene diamine and the sulfuric acid ester of 1-amino-benzene-4-$\beta$-hydroxyethylsolfone, the diazotization and coupling of protein were carried out under the conditions specified sub 3.

A quantitative analysis indicated an attachment of about 100 mg of IgG per gram of PVG carrier.

6. Oxidative activation of PVG with dimethyl sulfoxide/acetic anhydride 2 g of PVG were suspended in a mixture of 24 ml of dimethyl sulfoxide (DMSO) and 16 ml of glacial acetic acid and the whole was stirred overnight at room temperature.

Next, 400 ml of distilled water were added, the reaction product was filtered off with suction and washed with acetone and distilled water.

The incorporation of the spacer and the coupling of the protein was effected as described sub 3.

An attachment of 30 mg of IgG per gram of carrier material was found.

What is claimed is:

1. A process for producing a bond between polyvinylene glycol and a substance containing primary amino groups, which comprises treating said polyvinylene glycol with a medium to strong oxidant until a sufficient number of aldehyde groups is formed and then reacting the oxidation product with the substance containing primary amino groups.

2. The process of claim 1, wherein the substance containing primary amino groups is a biologically active substance or a substance capable of reacting with a biologically active substance.

3. The process of claim 2, wherein the biologically active substance is an enzyme, an activator, an inhibitor, an antigen or antibody, a plasma protein, a blood group specific substance, a polypeptide, a peptide, an amino acid, or a natural or synthetic effector.

4. The process of claim 1, wherein the oxidation product is first reacted with a bifunctional compound containing a primary amino group and the second functional group of the latter compound is then reacted with a biologically active substance or a substance capable of reacting with a biologically active substance.

5. The process of claim 1, wherein the polymer is polyvinylene glycol cross-linked with a bifuntional compound.

6. The process of claim 1, wherein the reaction product is treated with a reducing agent suitable to reduce Schiff's bases.

7. A product prepared by the method of claim 1.

* * * * *